(12) United States Patent
VanBuskirk (10) Patent No.: US 11,518,544 B2
(45) Date of Patent: Dec. 6, 2022

(54) DRIVESHAFT MISALIGNMENT MEASUREMENT SYSTEMS AND METHODS

(71) Applicant: Textron Innovations Inc., Providence, RI (US)

(72) Inventor: Matthew Carl VanBuskirk, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 682 days.

(21) Appl. No.: 16/516,088

(22) Filed: Jul. 18, 2019

(65) Prior Publication Data

US 2021/0016903 A1   Jan. 21, 2021

(51) Int. Cl.
| | |
|---|---|
| *B64F 5/60* | (2017.01) |
| *F16D 3/84* | (2006.01) |
| *F16C 1/04* | (2006.01) |
| *G01B 21/24* | (2006.01) |
| *B64C 27/14* | (2006.01) |

(52) U.S. Cl.
CPC ............ *B64F 5/60* (2017.01); *F16C 1/04* (2013.01); *F16D 3/845* (2013.01); *G01B 21/24* (2013.01); *B64C 27/14* (2013.01)

(58) Field of Classification Search
CPC ..... B64C 27/14; B64C 29/0033; B64D 35/08; B64D 43/00; B64D 45/00; B64D 2045/0085; B64F 5/60; F16C 1/04; F16D 3/845; G01B 21/24

See application file for complete search history.

(56) References Cited

U.S. PATENT DOCUMENTS

| | | | |
|---|---|---|---|
| 4,207,758 A | 6/1980 | Stone | |
| 8,079,274 B2 | 12/2011 | Mian et al. | |
| 9,240,083 B2 | 1/2016 | Isom et al. | |
| 9,346,561 B2 | 5/2016 | VanBuskirk et al. | |
| 2012/0269626 A1* | 10/2012 | Winzenz | F01D 25/04 29/889.6 |
| 2014/0058594 A1* | 2/2014 | Plowman | B64D 45/00 701/14 |
| 2015/0060594 A1* | 3/2015 | Nguyen | B29C 70/30 464/181 |
| 2015/0203196 A1* | 7/2015 | Heverly, II | B64C 27/001 701/3 |
| 2017/0305568 A1* | 10/2017 | King | B64C 27/28 |
| 2017/0363072 A1* | 12/2017 | Son | G01M 7/00 |
| 2018/0165897 A1* | 6/2018 | Hale | B64D 45/00 |

FOREIGN PATENT DOCUMENTS

GB           3819607 A1 * 12/2021   ............... G01H 1/00

* cited by examiner

*Primary Examiner* — James M McPherson
*Assistant Examiner* — Kyle J Kingsland
(74) *Attorney, Agent, or Firm* — Lawrence Youst PLLC (57) ABSTRACT

A driveshaft misalignment measurement system for a drivetrain of an aircraft includes a driveshaft having a first end forming a driveshaft spline and a drivetrain subsystem including a spline adapted to connect to the driveshaft spline to form a splined connection. Rotational energy is transferred between the drivetrain subsystem and the driveshaft via the splined connection. The driveshaft misalignment measurement system also includes accelerometers coupled to the drivetrain configured to detect acceleration data and a flight control computer configured to measure misalignment at the splined connection using the acceleration data.

17 Claims, 9 Drawing Sheets

DRIVESHAFT MISALIGNMENT MEASUREMENT SYSTEMS AND METHODS

TECHNICAL FIELD OF THE DISCLOSURE

The present disclosure relates, in general, to measuring driveshaft misalignment in aircraft and, in particular, to driveshaft misalignment measurement systems and methods that utilize acceleration data from accelerometers coupled to the drivetrain to determine driveshaft misalignment.

BACKGROUND

Driveshafts, or torque shafts, are used to transmit torque in an aircraft drivetrain. For example, driveshafts in a rotorcraft drivetrain transmit rotational energy from an engine or motor to a rotor via a gearbox. Driveshafts are subject to different types of misalignments that can reduce or prevent the efficient transmission of torque in the drivetrain. For example, static misalignment of a driveshaft can occur as a result of flight loads experienced during flight maneuvers. Installation stackup misalignment of a driveshaft may be caused by improper assembly or installation of drivetrain components. Driveshafts are also subject to oscillatory misalignment caused by rotor harmonics or other oscillatory vibrations that occur during flight. One example in which oscillatory driveshaft misalignment can be observed is in tiltrotor aircraft with hard-mounted drivetrains that experience high levels of rotor harmonics, aeroelastic phenomena and other vibrations.

Flex-coupling driveshafts are employed by current helicopters to combat driveshaft misalignment. Measuring oscillatory driveshaft misalignment in flex-coupling driveshaft systems, however, requires an exposed driveshaft since misalignment is typically measured directly at the driveshaft. Also, while driveshaft flex-couplings can reduce driveshaft misalignment, they are not feasible for all types of aircraft. For example, the nacelles of tiltrotor aircraft often use hard-mounted drivetrain components, the driveshafts of which are often obscured by a driveshaft housing that precludes direct misalignment measurements. For aircraft with hard-mounted driveshafts, the connections on either end of the driveshaft may have small misalignment limits, which if exceeded can fail or cause damage to the connection or driveshaft. Accordingly, a need has arisen for driveshaft misalignment measurement systems and methods that are effective across a wider variety of aircraft with different types of drivetrains.

SUMMARY

In a first aspect, the present disclosure is directed to a driveshaft misalignment measurement system for a drivetrain of an aircraft including a driveshaft having a first end forming a driveshaft spline and a drivetrain subsystem including a spline adapted to connect to the driveshaft spline to form a splined connection. Rotational energy is transferred between the drivetrain subsystem and the driveshaft via the splined connection. The driveshaft misalignment measurement system also includes accelerometers coupled to the drivetrain configured to detect acceleration data and a flight control computer configured to measure misalignment at the splined connection using the acceleration data.

In some embodiments, the driveshaft spline and the drivetrain subsystem spline may be complementary and may each be either an internal spline or an external spline. In certain embodiments, the drivetrain subsystem may include an engine and at least one of the accelerometers may be coupled to the engine. In some embodiments, the drivetrain subsystem may include a gearbox and at least one of the accelerometers may be coupled to the gearbox. In certain embodiments, the flight control computer may include an aircraft health monitoring system including a driveshaft misalignment measurement module configured to measure the misalignment at the splined connection using the acceleration data. In some embodiments, the driveshaft misalignment measurement module may include a displacement determination submodule configured to convert the acceleration data from the accelerometers into displacement data and a misalignment determination submodule configured to determine misalignment data at the splined connection using the displacement data. In certain embodiments, the driveshaft may have a second end forming a second driveshaft spline and the drivetrain subsystem may include an engine and a gearbox each including a spline adapted to connect to a respective one of the driveshaft splines to form first and second splined connections. In such embodiments, rotational energy may be transferred from the engine to the gearbox via the first and second splined connections and the flight control computer may be configured to measure misalignment at the first and second splined connections using the acceleration data.

In some embodiments, the accelerometers may include one or more engine accelerometers coupled to the engine and one or more gearbox accelerometers coupled to the gearbox. In certain embodiments, the driveshaft misalignment measurement system may include a driveshaft housing at least partially enclosing the driveshaft and the splined connection. In some embodiments, at least one of the accelerometers may be coupled to the driveshaft housing. In certain embodiments, the driveshaft misalignment measurement system may include an output device configured to generate a misalignment notification when the misalignment at the splined connection exceeds a misalignment threshold a predetermined number of times.

In a second aspect, the present disclosure is directed to a method for measuring driveshaft misalignment including receiving acceleration data from accelerometers mounted on a drivetrain; converting the acceleration data into displacement data; and determining misalignment data at a splined connection of the driveshaft using the displacement data.

In some embodiments, converting the acceleration data into the displacement data may include integrating the acceleration data. In certain embodiments, converting the acceleration data into the displacement data may include determining a displacement value at each accelerometer. In some embodiments, the method may include determining a displacement value at the splined connection using the accelerometer displacement values, the displacement data including the splined connection displacement value. In certain embodiments, determining the displacement value at the splined connection may include determining the displacement value at the splined connection using a location of the accelerometers. In some embodiments, determining the misalignment data at the splined connection may include multiplying each accelerometer displacement value and splined connection displacement value by a respective coefficient to form adjusted displacement values and combining the adjusted displacement values. In certain embodiments, determining the misalignment data at the splined connection may include determining the misalignment data using the splined connection displacement value. In some embodiments, determining the misalignment data at the splined connection may include determining the misalignment data at the splined connection using a location of the splined connection. In certain embodiments, determining the misalignment data at the splined connection may include determining lateral misalignment data and vertical misalignment data at the splined connection using the displacement data.

In some embodiments, determining the misalignment data at the splined connection may include determining a misalignment angle at the splined connection. In certain embodiments, the method may include determining whether the misalignment angle exceeds a misalignment angle threshold. In some embodiments, the method may include outputting a misalignment notification in response to the misalignment angle exceeding the misalignment angle threshold a predetermined number of times. In certain embodiments, receiving the acceleration data may include receiving the acceleration data to form acceleration time history data, converting the acceleration data into the displacement data may include converting the acceleration time history data into displacement time history data and determining the misalignment data at the splined connection using the displacement data may include determining misalignment time history data at the splined connection using the displacement time history data. In some embodiments, the method may include storing the acceleration time history data, the displacement time history data and the misalignment time history data in a storage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
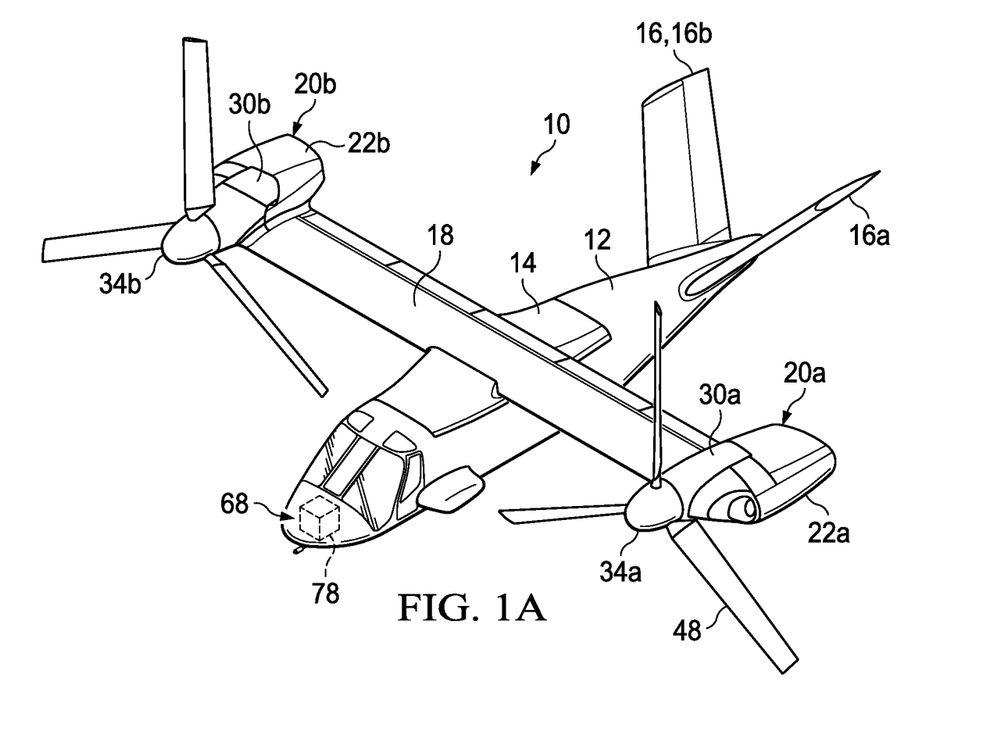
FIGS. 1A-1E are schematic illustrations of a tiltrotor aircraft implementing a driveshaft misalignment measurement system in accordance with embodiments of the present disclosure.
Figure 1B:
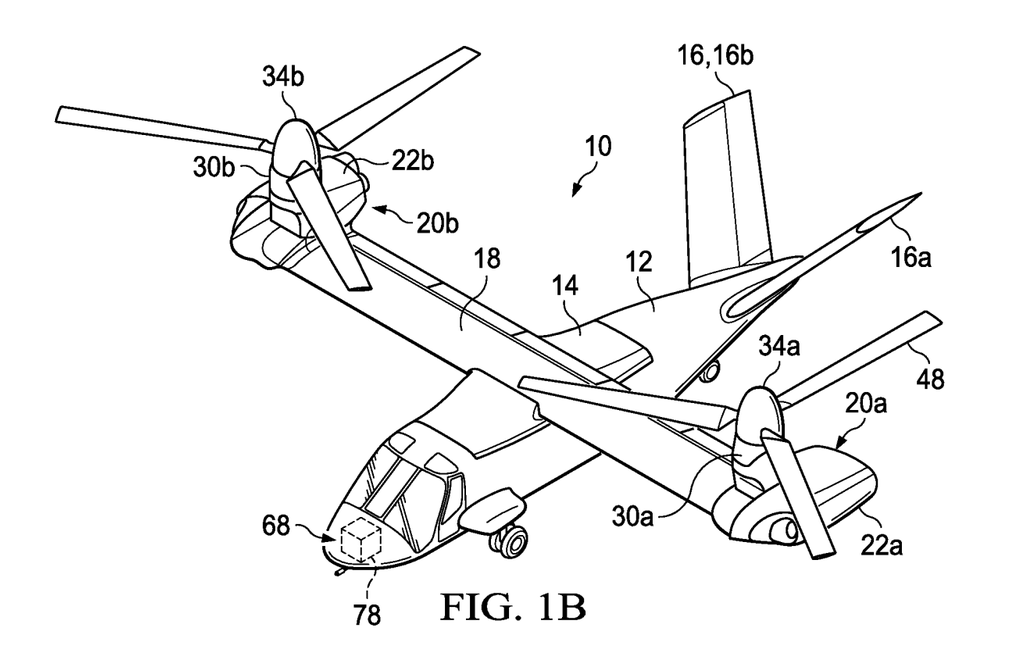
Figures 1C, 1D:
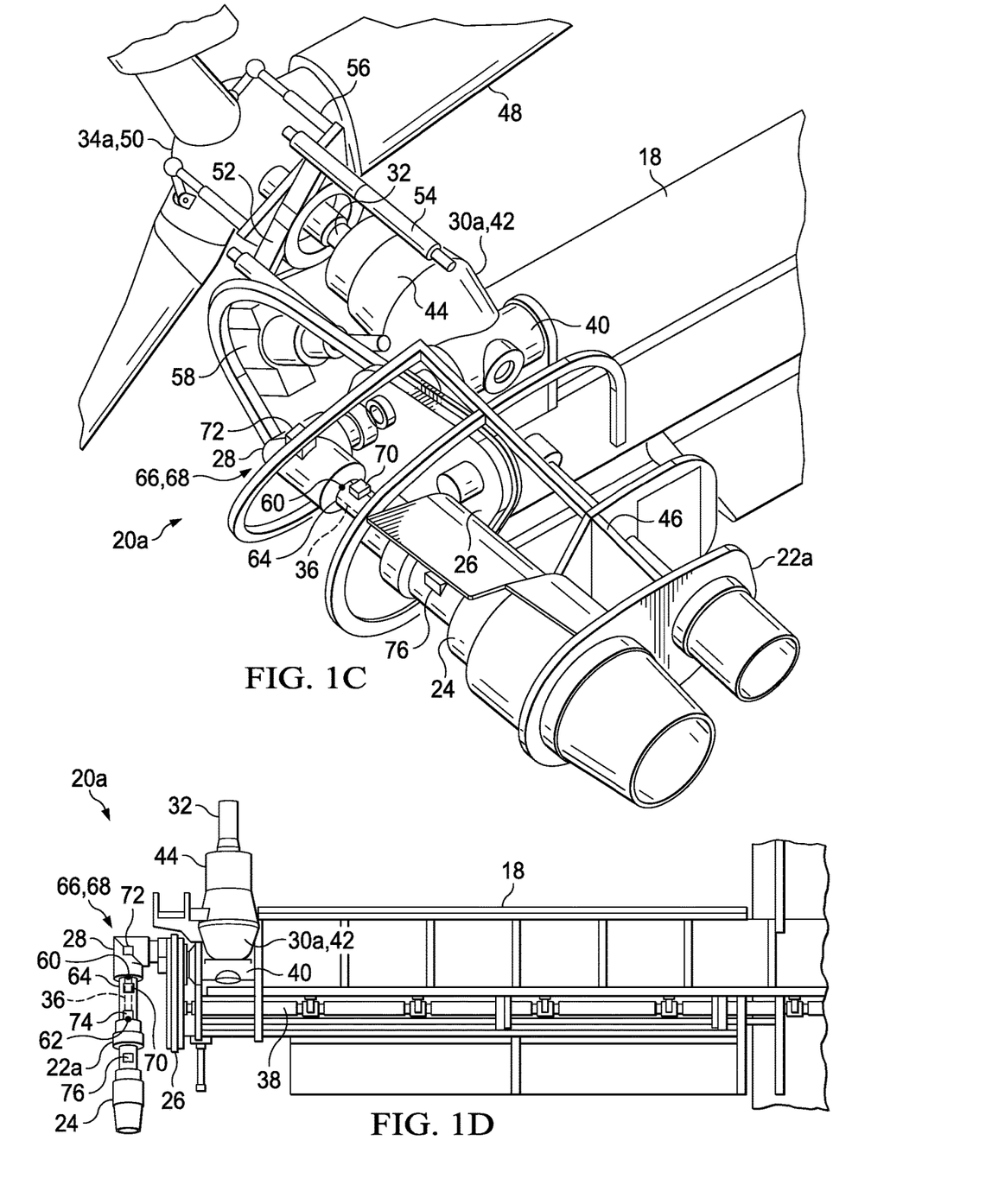

Referring to FIGS. 1A-1E in the drawings, a tiltrotor aircraft is schematically illustrated and generally designated 10. Tiltrotor aircraft 10 includes a fuselage 12, a wing mount assembly 14 and a tail assembly 16 including rotatably mounted tail members 16a, 16b having control surfaces operable for horizontal and/or vertical stabilization during forward flight. A wing member 18 is supported by wing mount assembly 14. Coupled to outboard ends of wing member 18 are propulsion assemblies 20a, 20b. Propulsion assembly 20a includes a nacelle depicted as fixed pylon 22a that houses an engine 24 and a transmission including a parallel axis gearbox 26 and a spiral bevel gearbox 28. Thus, the nacelle is fixed relative to wing member 18. In addition, propulsion assembly 20a includes a mast assembly 30a including a mast 32 that is rotatable relative to fixed pylon 22a, wing member 18 and fuselage 12 between a generally horizontal orientation, as best seen in FIGS. 1A, 1C and 1D, and a generally vertical orientation, as best seen in FIG. 1B. Propulsion assembly 20a also includes a proprotor assembly 34a, including proprotor blade assemblies radiating therefrom, which is rotatable responsive to torque and rotational energy provided via a rotor hub assembly and drive system mechanically coupled to engine 24, parallel axis gearbox 26 and spiral bevel gearbox 28. Similarly, propulsion assembly 20b includes a nacelle depicted as fixed pylon 22b that houses an engine and transmission and a mast assembly 30b that is rotatable relative to fixed pylon 22b, wing member 18 and fuselage 12. Propulsion assembly 20b also includes a proprotor assembly 34b, including proprotor blade assemblies radiating therefrom, which is rotatable responsive to torque and rotational energy provided via a rotor hub assembly and drive system mechanically coupled to the engine and transmission housed by fixed pylon 22b.

FIG. 1A illustrates tiltrotor aircraft 10 in airplane or forward flight mode, in which proprotor assemblies 34a, 34b are rotating in a substantially vertical plane to provide a forward thrust enabling wing member 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 34a, 34b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 34a, 34b are selectively positioned between forward flight mode and VTOL flight mode, which can be referred to as a conversion flight mode. Even though tiltrotor aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within fuselage 12 that provides torque and rotational energy to both proprotor assemblies 34a, 34b.

Referring now to FIGS. 1C and 1D, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Engine 24 of propulsion assembly 20a is substantially fixed relative to wing member 18. A driveshaft, or torque shaft, 36 transfers power from engine 24 to spiral bevel gearbox 28 to change torque direction by 90 degrees from engine 24 to parallel axis gearbox 26 via a clutch. Parallel axis gearbox 26 includes a plurality of gears in a gear train coupled to an interconnect driveshaft 38 and a quill shaft (not visible) that supplies torque to an input in spindle gearbox 40 of proprotor gearbox 42, a portion of which may include mast bearing assembly 44. Interconnect driveshaft 38 provides a torque path that enables a single engine of tiltrotor aircraft 10 to provide torque to both proprotor assemblies 34a, 34b in the event of a failure of the other engine. In the illustrated embodiment, interconnect driveshaft 38 includes a plurality of segments that share a common rotational axis.

Engine 24 is housed and supported in fixed pylon 22a (see FIGS. 1A and 1B) that may include features such as an inlet, aerodynamic fairings and exhaust, as well as other structures and systems to support and facilitate the operation of engine 24. The airframe of tiltrotor aircraft 10, which supports the various sections of tiltrotor aircraft 10 including fuselage 12, includes a propulsion assembly airframe section 46 that supports propulsion assembly 20a. Proprotor assembly 34a includes three rotor blade assemblies 48 that are coupled to a rotor hub 50. Rotor hub 50 is coupled to mast 32, which is coupled to proprotor gearbox 42. Together, spindle gearbox 40, proprotor gearbox 42 and mast 32 are part of mast assembly 30a that rotates relative to fixed pylon 22a. In addition, it should be appreciated by those having ordinary skill in the art that mast assembly 30a may include different or additional components, such as a pitch control assembly depicted as swashplate 52, actuators 54 and pitch links 56, wherein swashplate 52 is selectively actuated by actuators 54 to selectively control the collective pitch and the cyclic pitch of rotor blade assemblies 48 via pitch links 56. A linear actuator, depicted as conversion actuator 58 of fixed pylon 22a, is operable to reversibly rotate mast assembly 30a relative to fixed pylon 22a, which in turn selectively positions proprotor assembly 34a between forward flight mode, in which proprotor assembly 34a is rotating in a substantially vertical plane, and VTOL flight mode, in which proprotor assembly 34a is rotating in a substantially horizontal plane.

Engine 24 is hard-mounted to transmission 26, 28 via driveshaft 36. More specifically, driveshaft 36 forms a splined connection 60 with spiral bevel gearbox 28 and splined connection 62 with engine 24. Rotational energy is transferred from engine 24 to transmission 26, 28 via splined connections 60, 62. Driveshaft 36 is enclosed by a driveshaft housing 64 to protect driveshaft 36 and splined connections 60, 62. Driveshaft 36 may become misaligned with engine 24 and/or transmission 26, 28 due to a variety of causes including static misalignment resulting from flight loads experienced during flight maneuvers and/or installation stackup misalignment resulting from improper assembly of drivetrain 66. Driveshaft 36 may also experience oscillatory misalignment in which relative angular motion between engine 24 and transmission 26, 28 is caused by rotor harmonics or other vibrations, resulting in such angular misalignment being taken out by splined connections 60, 62 of driveshaft 36. The contribution of oscillatory misalignment to the total misalignment of driveshaft 36 can be large in hard-mounted systems. For example, oscillatory misalignment may contribute one-third to one-half of the total misalignment of driveshaft 36 in some aircraft. Driveshaft misalignment can cause splined connections 60, 62 to lock up, rendering them unable to transmit torque. Less severe driveshaft misalignment may lead to wear or damage at splined connections 60, 62. The misalignment threshold at which splined connections 60, 62 begin to experience damage or failure may be small such as three-fourths of a degree, one-half of a degree or less. Some current aircraft rely on driveshaft flex-couplings to accommodate misalignment between an engine and a transmission. Drivetrain 66, being hard-mounted, does not include driveshaft flex-couplings. Furthermore, driveshaft 36 is enclosed by driveshaft housing 64, which inhibits or prevents the direct measurement of oscillatory misalignment at splined connections 60, 62. For current aircraft, analysis during the design phase is performed to determine predicted misalignments and whether such predicted misalignments are below predetermined limits, but these predictions cannot be directly verified and actual misalignments cannot be directly measured in flight.

Tiltrotor aircraft 10 includes a driveshaft misalignment measurement system 68 that utilizes accelerometers 70, 72, 74, 76 coupled to known geometric locations on drivetrain 66 to back-calculate the resulting misalignment at each splined connection 60, 62. In some embodiments, raw acceleration data is measured by accelerometers 70, 72, 74, 76. A flight control computer 78 may then convert or integrate the raw acceleration data to calculate displacement at the locations of accelerometers 70, 72, 74, 76 and/or splined connections 60, 62. Flight control computer 78 may then use these displacement values in a formula that takes into account the relative locations of accelerometers 70, 72, 74, 76 and/or splined connections 60, 62 to derive the misalignments at splined connections 60, 62. In the illustrated embodiment, gearbox accelerometer 72 is coupled to spiral bevel gearbox 28, engine accelerometer 76 is coupled to engine 24 and accelerometers 70, 74 are coupled to driveshaft housing 64 adjacent to splined connections 60, 62. It will be appreciated by one of ordinary skill in the art, however, that more or less accelerometers may be utilized by driveshaft misalignment measurement system 68 to calculate the misalignment at splined connections 60, 62, and that such accelerometers may be located anywhere on drivetrain 66.

Figure 1E:
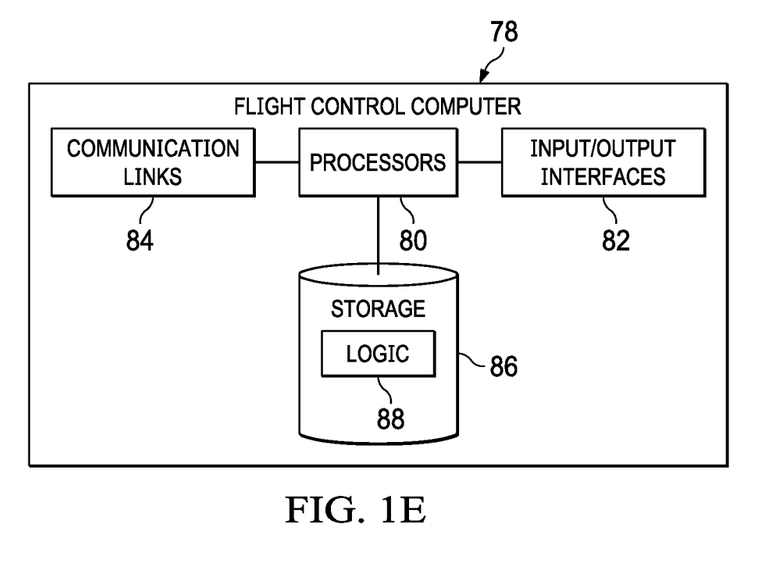
Figure 2A:
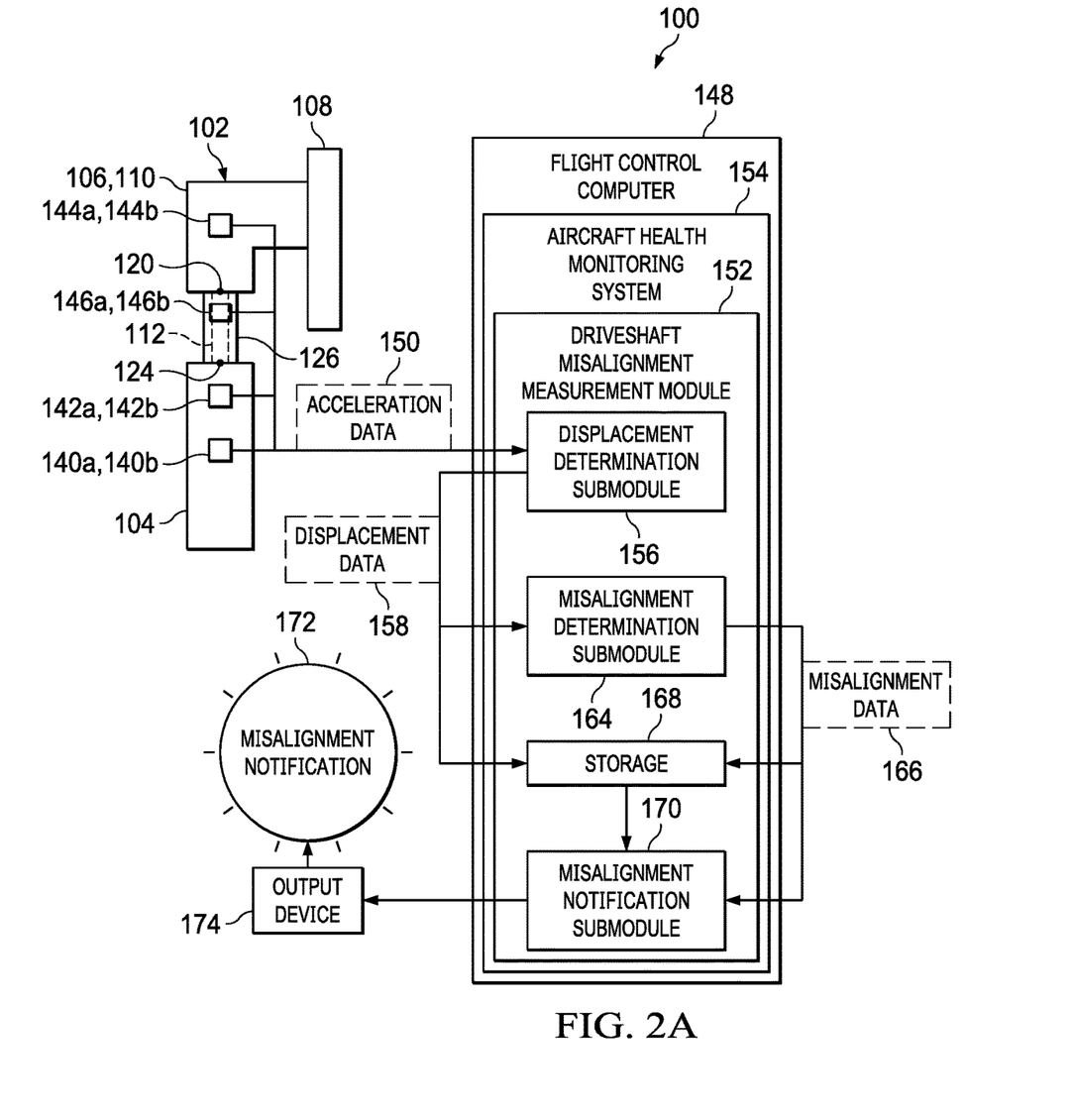
FIGS. 2A-2D are schematic illustrations of a driveshaft misalignment measurement system implemented on a drivetrain of an aircraft in accordance with embodiments of the present disclosure.
Figure 2B:
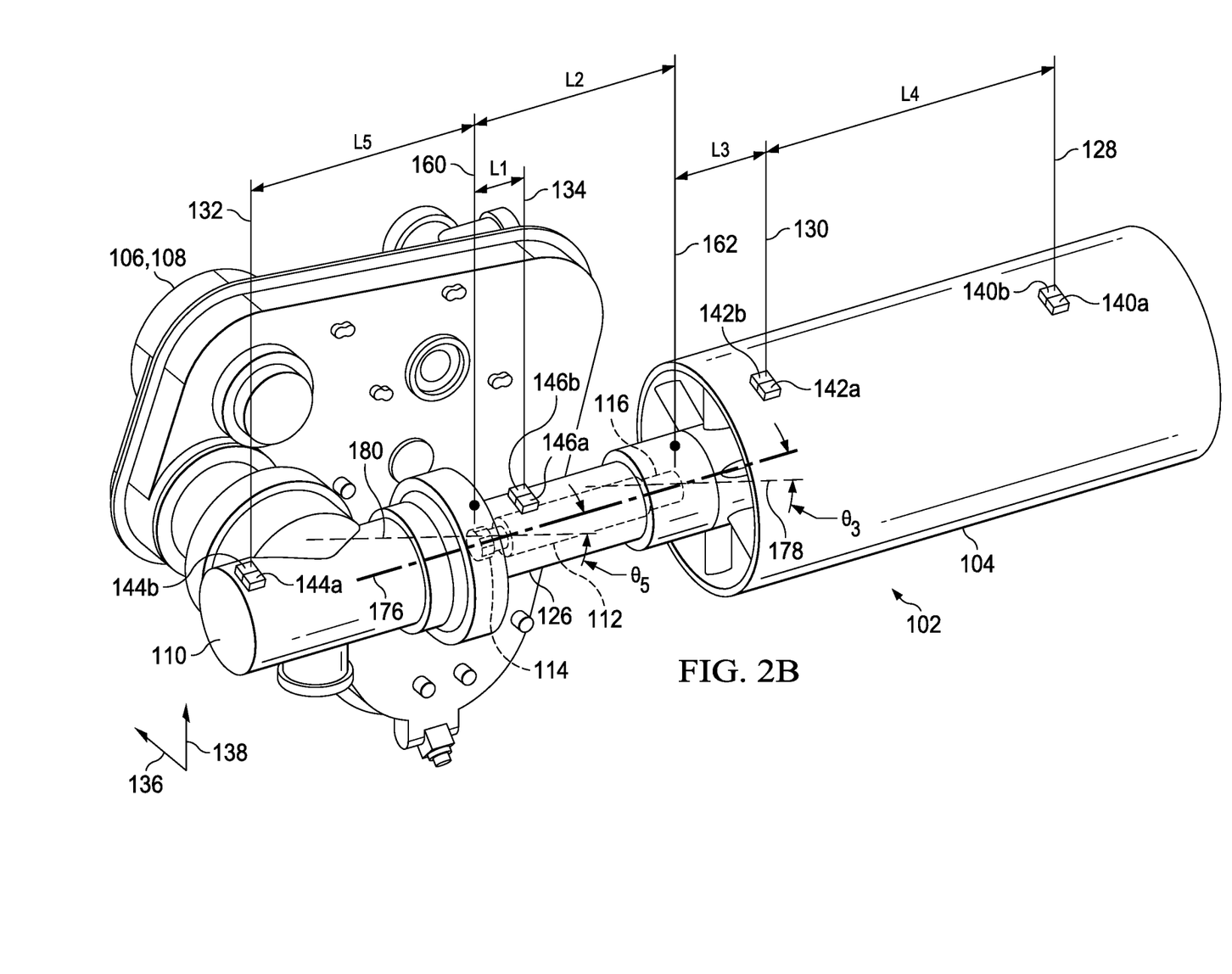
Figure 2C:
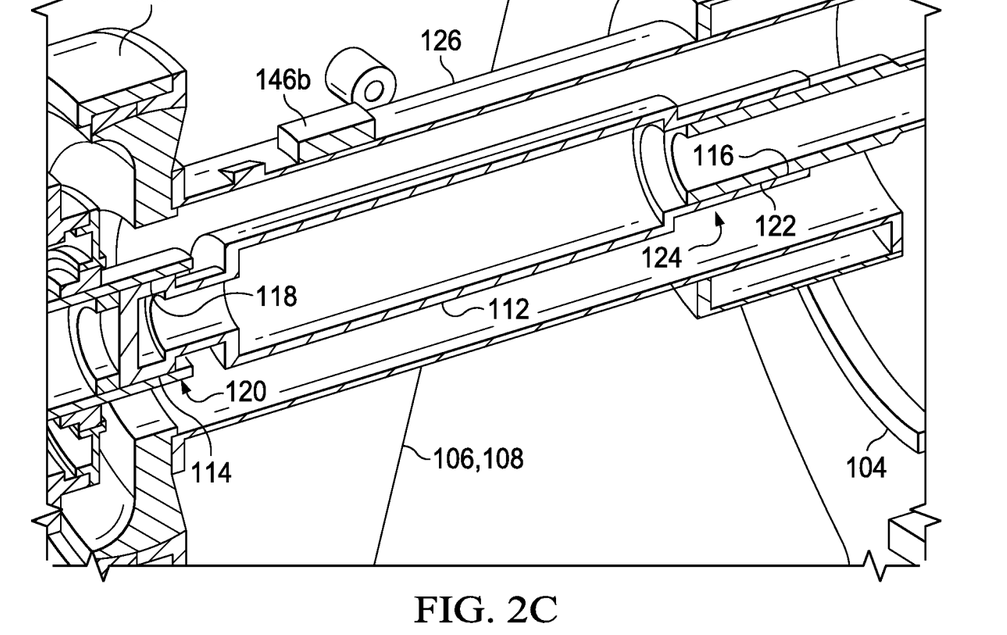
Figure 2D:
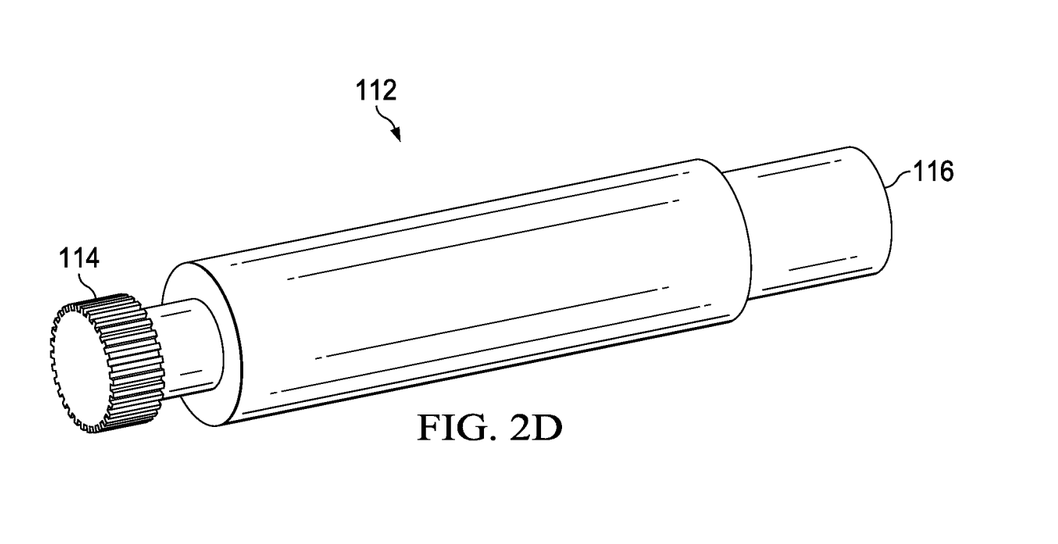

Tiltrotor aircraft 10 may be a fly-by-wire tiltrotor aircraft that utilizes flight control computer 78 as part of a flight control system. As best seen in FIG. 1E, flight control computer 78 may include one or more processors 80, input/output (I/O) interfaces 82, communication links 84 and storage, or memory, 86. In other embodiments, flight control computer 78 may include more, less or other components. Flight control computer 78 may be operable to perform one or more steps, processes or operations of the illustrative embodiments described herein, although the illustrative embodiments may also be implemented using computers other than flight control computer 78, including computers onboard or not onboard tiltrotor aircraft 10. The illustrative embodiments may also employ multiple flight control computers 78 or other computers networked together in one or more public and/or private computer networks.

Processors 80 may be devices operable to execute logic contained within a medium such as storage 86. Non-limiting examples of processors 80 include one or more microprocessors, one or more nanoprocessors, one or more applications and/or other logic. Input/output interfaces 82 may include any device or interface operable to enable communication between flight control computer 78 and users, such as a pilot of tiltrotor aircraft 10 or ground control personnel. Non-limiting examples of input/output interfaces 82 include a mouse, keyboard, mobile devices, voice interfaces, displays such as touch-screen displays or printers.

Communication links 84 are operable to facilitate communication between flight control computer 78 and other elements of tiltrotor aircraft 10, such as other flight control computers, a pilot inceptor, accelerometers 70, 72, 74, 76 or other systems. Communication links 84 may also facilitate communication with systems not onboard tiltrotor aircraft 10, such as ground network computers, satellites or a computing cloud. Communication links 84 may connect to any number and combination of wired or wireless networks, data buses, data transmission conduits, electrical buses or electrical conduits suitable for data or electrical signal transmission. Communication links 84 may, for example, communicate audio or video signals, electrical voltages or currents, internet protocol packets, frame relay frames, asynchronous transfer mode cells or other data between network addresses. Communication links 84 may be configured to connect to a computer network or a variety of other communicative platforms including, but not limited to, a public switched telephone network (PSTN), a public or private data network, one or more intranets, a local area network (LAN), a metropolitan area network (MAN), a wide area network (WAN), a wired or wireless network, a local, regional or global communication network, an optical network, a satellite network, a cellular network, an enterprise intranet, the Internet, other suitable network interfaces or any combination thereof.

Storage 86 may be any suitable storage medium and store any data for use by flight control computer 78. Storage 86 may include one or more tangible, computer-readable or computer-executable storage media. Non-limiting examples of storage 86 include computer memory such as random access memory (RAM) or read only memory (ROM), mass storage media such as a hard disk, removable storage media such as a compact disk, flash drive or a digital video disk (DVD), database or network storage such as a server or other computer-readable media. Storage 86 can also store data such as formulas or look-up tables used in the operation of the illustrative embodiments. In some embodiments, storage 86 stores logic 88. Logic 88 facilitates operation of flight control computer 78 and other systems of tiltrotor aircraft 10. Logic 88 may perform operations when executed by flight control computer 78. For example, logic 88 may include a computer program, hardware, software, firmware, control laws (CLAWs), formulas, computer-executable instructions or any other instructions or logic capable of being executed by flight control computer 78. The operations of the illustrative embodiments, including the operations of the various modules of flight control computer 78, may be performed by processors 80 based at least in part on logic 88 stored in storage 86. Logic 88 may also be embedded within any other suitable medium without departing from the scope of the illustrative embodiments.

It should be appreciated that tiltrotor aircraft 10 is merely illustrative of a variety of aircraft that can implement the embodiments disclosed herein. Indeed, driveshaft misalignment measurement system 68 may be implemented on any aircraft. Other aircraft implementations can include hybrid aircraft, tiltwing aircraft, quad tiltrotor aircraft, helicopters, unmanned aircraft, gyrocopters, propeller-driven airplanes, compound helicopters, drones, jets and the like. As such, those skilled in the art will recognize that driveshaft misalignment measurement system 68 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2D in the drawings, a driveshaft misalignment measurement system 100 for a drivetrain 102 of an aircraft is schematically illustrated. Drivetrain 102 includes engine 104 and transmission 106 including parallel axis gearbox 108 and spiral bevel gearbox 110. Interposed between engine 104 and transmission 106 is driveshaft 112. The transmission end of driveshaft 112 forms an external, crown-tooth spline 114 and the engine end of driveshaft 112 forms an internal spline 116. Spiral bevel gearbox 110 includes an internal spline 118 that is complementary to external spline 114 to form splined connection 120. Engine 104 includes an external spline 122 complementary to internal spline 116 of driveshaft 112 to form splined connection 124. Rotational energy is transferred from engine 104 to transmission 106 via splined connections 120, 124. While driveshaft 112 is illustrated as forming external spline 114 and internal spline 116 on its transmission end and engine end, respectively, in other embodiments the transmission end of driveshaft 112 may form an internal spline and the engine end of driveshaft 112 may form an external spline with transmission 106 and engine 104 being complementary thereto. Splined connections 120, 124 may utilize any type of spline including parallel key splines, involute splines, crowned splines, serrations, helical splines, ball splines or any other type of spline. In yet other embodiments, driveshaft 112 may be connected to engine 104 and transmission 106 without the use of splines by using, for example, a structurally integral driveshaft through engine 104 and transmission 106 or by the use of fasteners, welding or other coupling techniques. Driveshaft housing 126 fully encloses driveshaft 112 and splined connections 120, 124, although in other embodiments driveshaft housing 126 may partially enclose driveshaft 112 and/or splined connections 120, 124.

Driveshaft misalignment measurement system 100 also includes accelerometers coupled to drivetrain 102 at locations 128, 130, 132, 134 to detect acceleration data. Two accelerometers are coupled at each location 128, 130, 132, 134 to capture acceleration in both a lateral direction 136 and a vertical direction 138. In particular, accelerometers 140a, 140b are coupled at location 128 on a middle portion of engine 104, accelerometers 142a, 142b are coupled at location 130 on a forward portion of engine 104, accelerometers 144a, 144b are coupled at location 132 on spiral bevel gearbox 110 and accelerometers 146a, 146b are coupled at location 134 on driveshaft housing 126 near splined connection 120. Accelerometers 140a, 140b, 142a, 142b, 144a, 144b, 146a, 146b are generally colinear. In other embodiments, only a single accelerometer may be placed at each location 128, 130, 132, 134. One or more accelerometers may also be coupled on other portions of drivetrain 102 such as on parallel axis gearbox 108.

Driveshaft misalignment measurement system 100 includes flight control computer 148, which implements modules to measure misalignment at splined connections 120, 124 using acceleration data 150 detected by accelerometers 140a, 140b, 142a, 142b, 144a, 144b, 146a, 146b. Flight control computer 148 implements a driveshaft misalignment measurement module 152 and receives acceleration data 150 from accelerometers 140a, 140b, 142a, 142b, 144a, 144b, 146a, 146b. Driveshaft misalignment measurement module 152 may be part of an aircraft health monitoring system 154. Acceleration data 150 may include lateral acceleration data from accelerometers 140a, 142a, 144a, 146a and vertical acceleration data from accelerometers 140b, 142b, 144b, 146b. In other embodiments, acceleration data 150 may include acceleration data in only one direction or, alternatively, in more than two directions. Driveshaft misalignment measurement module 152 includes a displacement determination submodule 156 to convert acceleration data 150 into displacement data 158. In particular, displacement determination submodule 156 calculates a displacement value at locations 128, 130, 132, 134 of accelerometers 140a, 140b, 142a, 142b, 144a, 144b, 146a, 146b by, for example, integrating acceleration data 150. Displacement determination submodule 156 may integrate acceleration data 150 twice to calculate displacement data 158 at locations 128, 130, 132, 134. For example, lateral acceleration data detected by accelerometer 140a may be integrated by displacement determination submodule 156 into lateral displacement data that indicates the lateral displacement of accelerometer 140a at location 128.

In some embodiments, the displacement values at spline centers 160, 162 of splined connections 120, 124 may be calculated by displacement determination submodule 156 using the displacement values at locations 128, 130, 132, 134 of accelerometers 140a, 140b, 142a, 142b, 144a, 144b, 146a, 146b and/or the geometry or locations 128, 130, 132, 134 of accelerometers 140a, 140b, 142a, 142b, 144a, 144b, 146a, 146b. Thus, the displacements at splined connections 120, 124 may be extrapolated based on acceleration data 150 from accelerometers 140a, 140b, 142a, 142b, 144a, 144b, 146a, 146b placed at locations other than at splined connections 120, 124. In one non-limiting example, the displacement value (dv2) at splined connection 124 may be extrapolated using the following expression:

$$dv2 = D2 - ((D3-D2)/L4)*L3,$$

wherein D2 is the displacement at location 130 of accelerometers 142a, 142b, D3 is the displacement at location 128 of accelerometers 140a, 140b, L4 is the distance between locations 128 and 130 of accelerometers 140a, 140b and 142a, 142b and L3 is the distance between location 130 of accelerometers 142a, 142b and spline center 162 of splined connection 124. In this non-limiting example, the displacement value (dv1) at splined connection 120 may be calculated using the following expression:

$$dv1 = D1 - ((dv2-D1)/L2)*L1,$$

wherein D1 is the displacement at location 134 of accelerometers 146a, 146b, L2 is the distance between spline centers 160, 162 of splined connections 120, 124 and L1 is the distance between spline center 160 of splined connection 120 and location 134 of accelerometers 146a, 146b. In other embodiments, the distance (L5) between spline center 160 of splined connection 120 and location 132 of accelerometers 144a, 144b may be used to calculate the displacement at either or both of splined connections 120, 124. In other embodiments, one or more accelerometers may be located to eliminate the need to calculate extrapolated motion at spline centers 160, 162 of splined connections 120, 124.

Driveshaft misalignment measurement module 152 also includes a misalignment determination submodule 164 to determine misalignment data 166, such as a misalignment angle, at splined connections 120, 124 of driveshaft 112 using displacement data 158. Misalignment determination submodule 164 may determine misalignment data 166 using a variety of factors including the displacement values at locations 128, 130, 132, 134 of accelerometers 140a, 140b, 142a, 142b, 144a, 144b, 146a, 146b, the geometry and/or locations 128, 130, 132, 134, 160, 162 of accelerometers 140a, 140b, 142a, 142b, 144a, 144b, 146a, 146b and splined connections 120, 124 as well as the extrapolated displacements of splined connections 120, 124. For example, misalignment determination submodule 164 may multiply each accelerometer displacement value and splined connection displacement value by a respective coefficient to form adjusted displacement values. Misalignment determination submodule 164 may then combine the adjusted displacement values such as by summating or taking the root sum squared of the adjusted displacement values. Because accelerometers 140a, 142a, 144a, 146a detect acceleration in lateral direction 136 and accelerometers 140b, 142b, 144b, 146b detect acceleration in vertical direction 138, misalignment data 166 for splined connections 120, 124 include both horizontal misalignment data and vertical misalignment data such as a horizontal misalignment angle and a vertical misalignment angle. In other embodiments, misalignment data in only a single direction may be calculated by misalignment determination submodule 164. In yet other embodiments, misalignment data 166 may be calculated for only one of splined connections 120, 124, in which case displacement data 158 for only three accelerometers may be used.

Driveshaft misalignment measurement module 152 includes storage 168 to store acceleration data 150, displacement data 158 and misalignment data 166. The data stored by storage 168 may be analyzed at a later time such as after the aircraft lands or during maintenance or repair. In some embodiments, acceleration data 150 may include acceleration time history data, displacement data 158 may include displacement time history data and misalignment data 166 may include misalignment time history data. Acceleration, displacement and misalignment time history data may be stored by storage 168 so that each of these types of data may be analyzed over a desired time period.

Driveshaft misalignment measurement module 152 also includes a misalignment notification submodule 170 to initiate a misalignment notification 172 in response to misalignment at either or both of splined connections 120, 124 exceeding a misalignment threshold a predetermined number of times. In some embodiments, misalignment notification 172 may be generated if the misalignment at splined connections 120, 124 exceeds the misalignment threshold a single time, while in other embodiments a predetermined plurality of misalignments triggers misalignment notification 172. In some embodiments, misalignment data 166 includes the misalignment angles at splined connections 120, 124 and misalignment notification 172 is generated in response to the misalignment angle exceeding a misalignment angle threshold a predetermined number of times. The misalignment angle threshold may be dependent upon the mechanics of splined connections 120, 124 and may range between a fraction of a degree to several degrees such as one-half or three-fourths of a degree. Misalignment notification 172 is outputted by output device 174. Output device 174 may have visual, audio, tactile and/or other output capabilities with which to output misalignment notification 172. Misalignment notification 172 may contain various types of information such as the number of degrees or radians at which splined connections 120, 124 are misaligned, which of splined connections 120 or 124 are affected, the rate at which misalignments are occurring as well as other parameters. Output device 174 may be located on the aircraft or elsewhere such as a ground control center.

In one non-limiting example, the misalignment angle ($\theta_3$) at splined connection 124 between driveshaft centerline 176 and engine centerline 178 may be calculated by misalignment determination submodule 164 using the following expression:

$$\theta_3=((dv1-dv2)/L2)*(180/\pi)+((D2-dv2)/L3)*(180/\pi).$$

The misalignment angle ($\theta_5$) at splined connection 120 between driveshaft centerline 176 and transmission centerline 180 may be calculated using the following expression:

$$\theta_5=((dv1-dv2)/L2)*(180/\pi)+((D1-dv4)/L3)*(180/\pi).$$

wherein D4 is the displacement at location 132 of accelerometers 144a, 144b.

Figure 3:
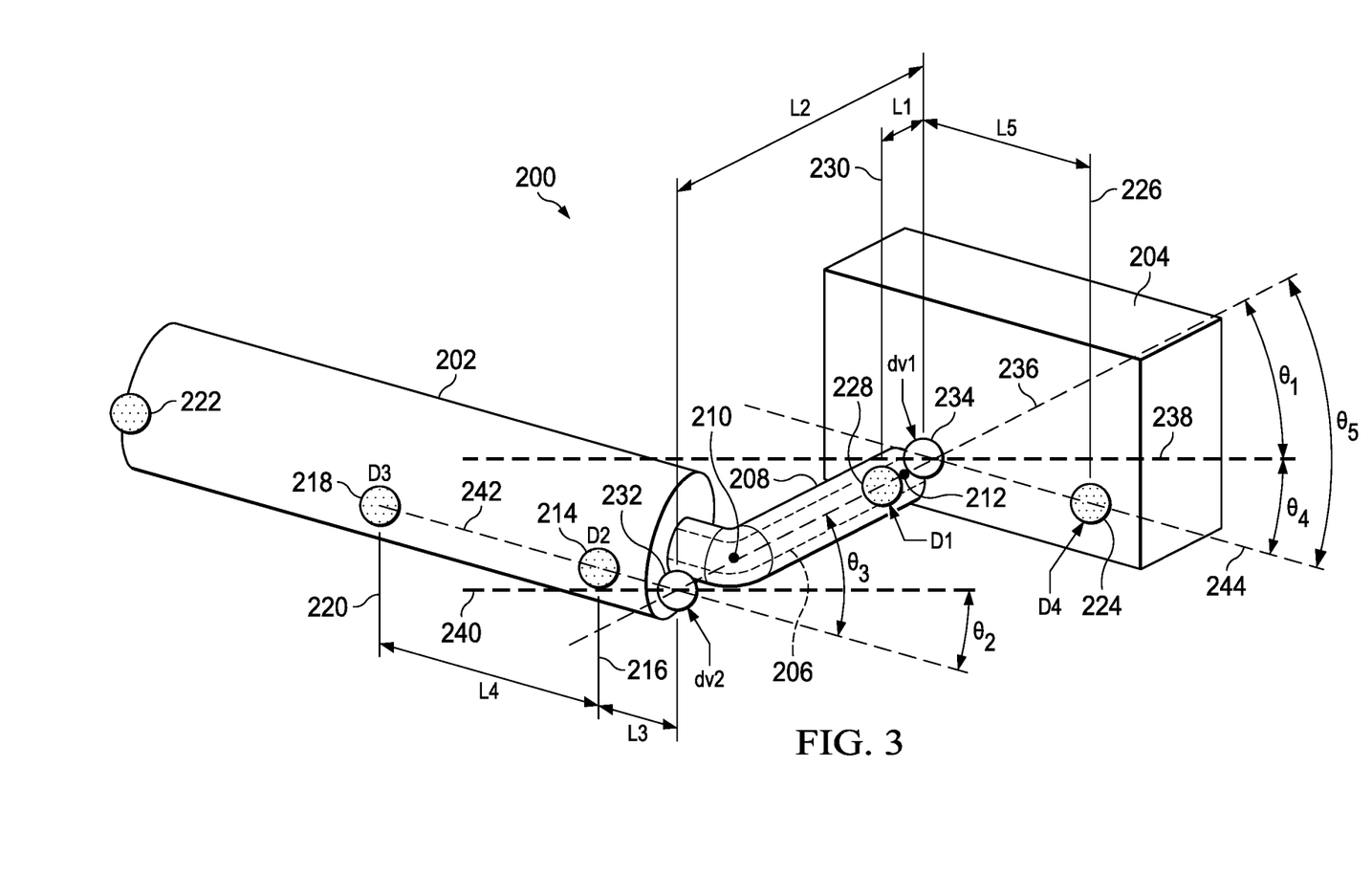
FIG. 3 is an isometric view of an aircraft drivetrain implementing a driveshaft misalignment measurement system in accordance with embodiments of the present disclosure.

Referring to FIG. 3 in the drawings, a drivetrain implementing a driveshaft misalignment measurement system is schematically illustrated and generally designated 200. Drivetrain 200 includes engine 202 and gearbox 204. Rotational energy is transferred from engine 202 to gearbox 204 by driveshaft 206, which is enclosed by driveshaft housing 208. Engine 202 is connected to driveshaft 206 at splined connection 210 and gearbox 204 is connected to driveshaft 206 at splined connection 212. Engine 202 includes accelerometer 214 at location 216 near the front of engine 202 and accelerometer 218 at location 220 near the middle of engine 202. In some embodiments, engine 202 may include a third accelerometer 222 at the rear of engine 202. Gearbox 204 includes accelerometer 224 at location 226. Accelerometer 228 is at location 230 on driveshaft housing 208 adjacent to splined connection 212.

In the illustrated embodiment, the displacement values at extrapolated points 232, 234 are used to calculate the misalignment angle at splined connection 210 ($\theta_3$) and the misalignment angle at splined connection 212 ($\theta_5$). The displacement (dv2) at extrapolated point 232 and the displacement (dv1) at extrapolated point 234 may be calculated using the following expressions:

$$dv2=D2-((D3-D2)/L4)*L3 \text{ and}$$

$$dv1=D1-((dv2-D1)/L2)*L1,$$

wherein D2 is the displacement of accelerometer 214, D3 is the displacement of accelerometer 218, L4 is the distance between accelerometer 214 and accelerometer 218, D1 is the displacement of accelerometer 228, L2 is the distance between extrapolated point 232 and extrapolated point 234 and L1 is the distance between accelerometer 228 and extrapolated point 234.

The misalignment angle ($\theta_1$) between driveshaft centerline 236 and gearbox centerline 238 and the misalignment angle ($\theta_2$) between engine centerline 240 and engine accelerometer centerline 242 may be determined by the following expressions:

$$\theta_1=((dv1-dv2)/L2)*(180/\pi) \text{ and}$$

$$\theta_2=((D2-dv2)/L3)*(180/\pi).$$

The misalignment angle ($\theta_3$) at splined connection 210 between driveshaft centerline 236 and engine accelerometer centerline 242 may be calculated by adding $\theta_1$ and $\theta_2$ as follows:

$$\theta_3=\theta_1+\theta_2.$$

Misalignment angle ($\theta_4$) between gearbox centerline 238 and centerline 244 intersecting extrapolated point 234 and accelerometer 224 may be calculated using the following expression:

$$\theta_4=((dv1-D4)/L5)*(180/\pi),$$

wherein D4 is the displacement of accelerometer 224 and L5 is the distance between extrapolated point 234 and accelerometer 224. The misalignment angle ($\theta_5$) at splined connection 212 between driveshaft centerline 236 and centerline 244 may be calculated by adding $\theta_1$ and $\theta_4$ follows:

$$\theta_5=\theta_1+\theta_4.$$

The illustrated example shows at least two misalignment angles for each splined connection 210, 212. Indeed, misalignment angles may be calculated in at least two directions for a total of at least four misalignment angles for both splined connections 210, 212.

Figure 4A:
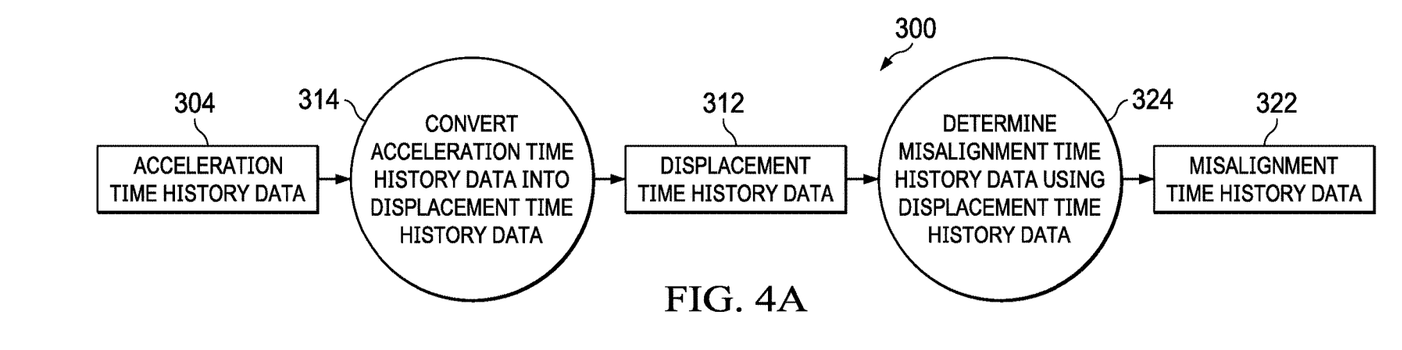
FIGS. 4A-4B are flowcharts of a method for measuring driveshaft misalignment in accordance with embodiments of the present disclosure.
Figure 4B:
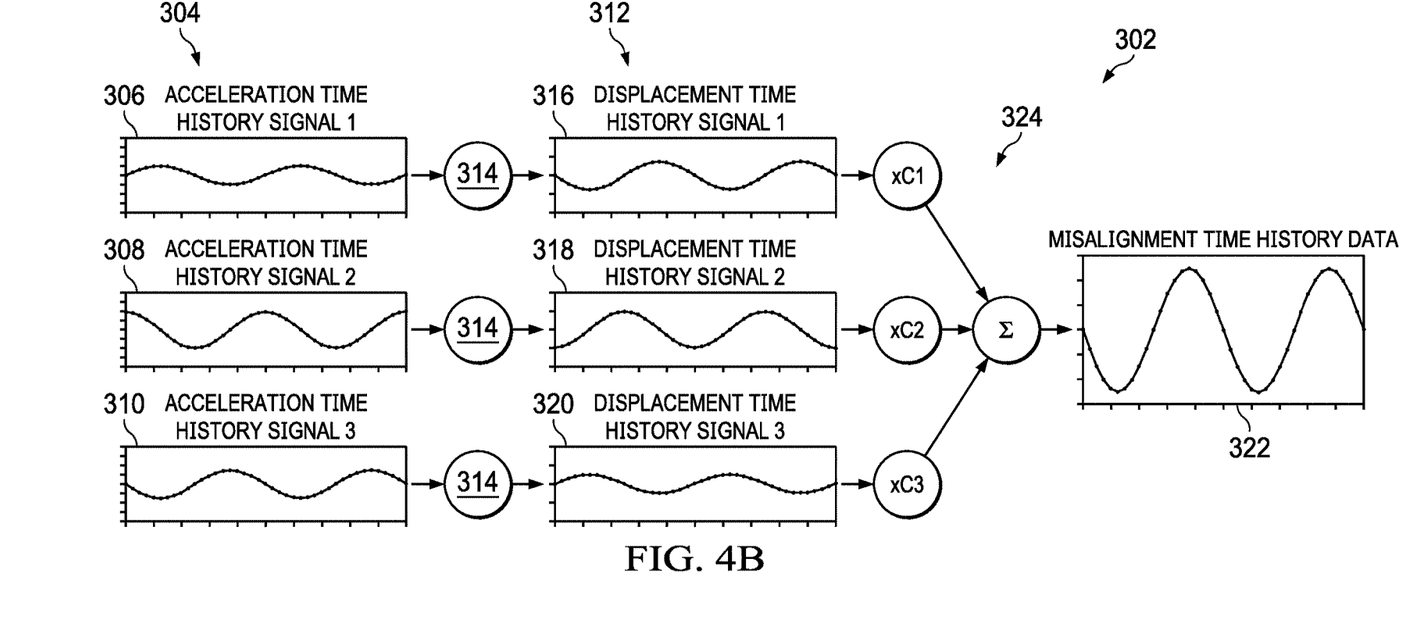

Referring to FIGS. 4A-4B in the drawings, a method for calculating oscillatory misalignment for a splined connection of a drivetrain is schematically illustrated as related flowcharts 300, 302. The illustrated method calculates one misalignment angle in one direction such as the lateral or vertical direction. The method uses three signals to determine the single misalignment angle, with one of the signals representing acceleration and displacement data at the center of rotation for the calculated misalignment angle such as at the center of the splined connection. In other embodiments, a different number of signals may be used to calculate any number of angles in any direction.

The illustrated method begins with acceleration time history data 304 received from a plurality of accelerometers generating acceleration time history signals 306, 308, 310. Acceleration may be measured in any unit such as inches/second$^2$ or meters/second$^2$. In some examples, engineering standards for signal measurement and data acquisition may be employed to capture the desired data, including, but not limited to, pre-sample filters and sampling rate selection to avoid folding or aliasing. The method then converts acceleration time history data 304 into displacement time history data 312 in conversion processing step 314. Displacement time history data 312 is represented by displacement time history signals 316, 318, 320 in FIG. 4B. Conversion processing step 314 may include twice integrating each acceleration time history signal 306, 308, 310 to calculate respective displacement time history signals 316, 318, 320. Misalignment time history data 322 for the splined connection may then be calculated using displacement time history data 312 at misalignment determination processing step 324. In misalignment determination processing step 324, each displacement time history signal 316, 318, 320 may be multiplied by a respective coefficient C1, C2, C3 that is determined based on the relative geometry of the accelerometers and splined connections. Having been adjusted by coefficients C1, C2, C3, the adjusted displacement signals may be combined such as by summation or taking the root sum squared to calculate misalignment time history data 322. A non-limiting example of the misalignment determination processing step 324 may be expressed as follows:

$$Misalignment = C1*Displacement1 + C2*Displacement2 + C3*Displacement3,$$

wherein Displacement 1, Displacement 2 and Displacement 3 represent displacement time history signals 316, 318, 320, respectively. Misalignment time history data 322 may be measured in degrees or radians and tracked over time to detect events in which the misalignment angle exceeds the misalignment angle threshold. If misalignment time history data 322 exceeds the misalignment angle threshold more than a predetermined number of times, a notification may be generated indicating that the splined connection is out of alignment and needs servicing.

Figures 5A, 5B, 5C:
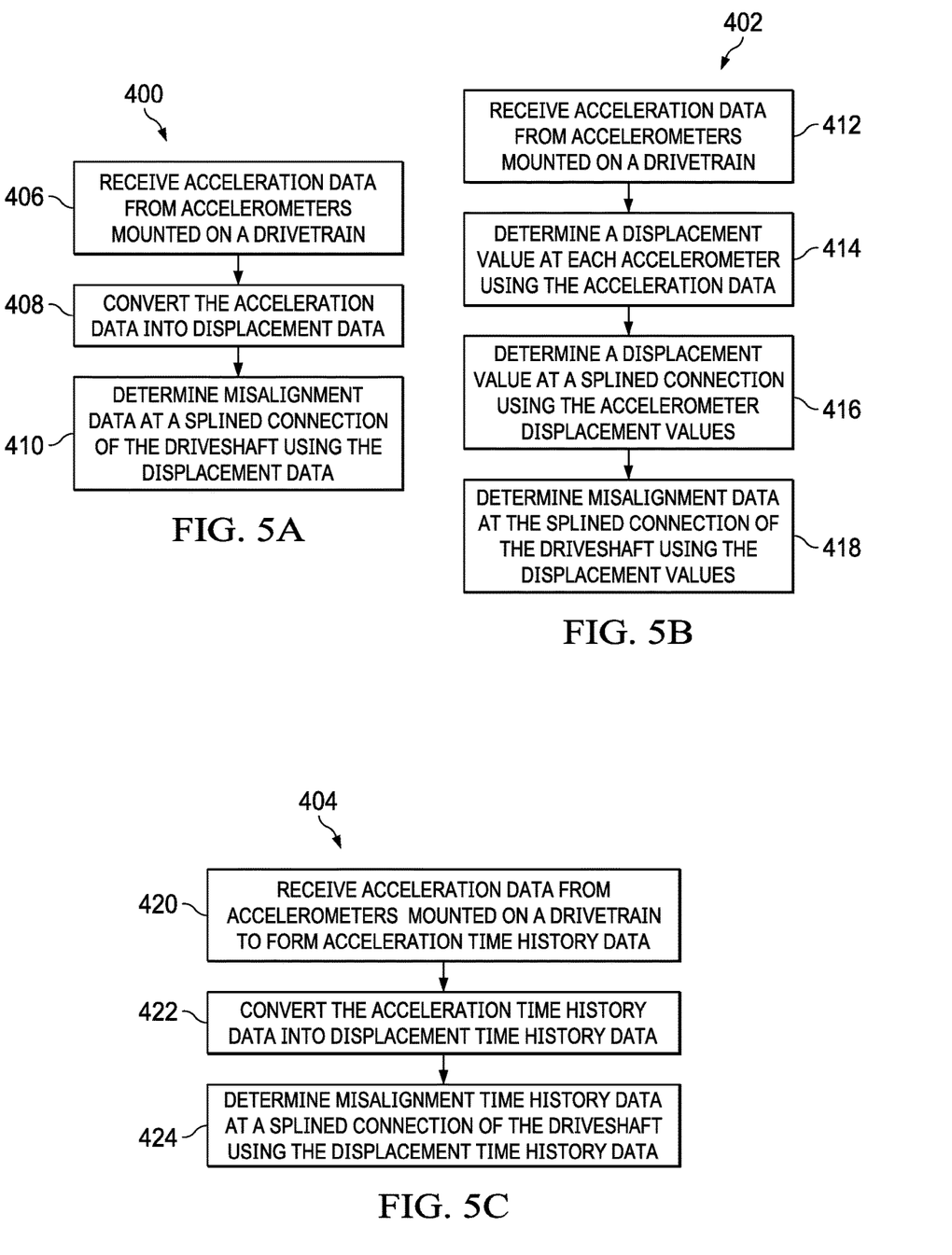
FIGS. 5A-5C are flowcharts of various methods for measuring driveshaft misalignment in accordance with embodiments of the present disclosure.

Referring to FIGS. 5A-5C in the drawings, methods for measuring driveshaft misalignment for an aircraft are illustrated as flowcharts 400, 402, 404. In FIG. 5A, the method includes receiving acceleration data from accelerometers mounted on a drivetrain (step 406). The method includes converting the acceleration data into displacement data (step 408). In some embodiments, converting the acceleration data into displacement data may include integrating the acceleration data. The method also includes determining misalignment data at a splined connection of the driveshaft using the displacement data (step 410). The misalignment data may be determined by utilizing the locations of the accelerometers and/or the splined connections. The misalignment data may include either or both of lateral misalignment data or vertical misalignment data. The misalignment data may also include the misalignment angle at the splined connection. In some embodiments, if the misalignment angle exceeds a misalignment angle threshold a predetermined number of times, a misalignment notification may be outputted.

In FIG. 5B, the method includes receiving acceleration data from accelerometers mounted on a drivetrain (step 412). The method includes determining a displacement value at each accelerometer using the acceleration data (step 414). The method also includes determining a displacement value at the splined connection using the accelerometer displacement values (step 416). The displacement value at the splined connection may also be determined using the locations of the accelerometers. The method also includes determining misalignment data at the splined connection of the driveshaft using the displacement values (step 418). In some embodiments, determining the misalignment data at the splined connection may include multiplying each accelerometer displacement value and splined connection displacement value by a respective coefficient to form adjusted displacement values, and then combining the adjusted displacement values.

In FIG. 5C, the method includes receiving acceleration data from accelerometers mounted on a drivetrain to form acceleration time history data (step 420). The method also includes converting the acceleration time history data into displacement time history data (step 422). The method also includes determining misalignment time history data at the splined connection of the driveshaft using the displacement time history data (step 424). In some embodiments, the method may include storing the acceleration time history data, the displacement time history data and the misalignment time history data in a storage.

The flowcharts and block diagrams in the depicted embodiments illustrate the architecture, functionality and operation of some possible implementations of apparatus, methods and computer program products. In this regard, each block in the flowchart or block diagrams may represent a module, segment or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A driveshaft misalignment measurement system for a drivetrain of an aircraft comprising:
    a driveshaft having a first end forming a driveshaft engine spline and a second end forming a driveshaft gearbox spline;
    a drivetrain subsystem including an engine and a gearbox each including a spline adapted to connect to a respective one of the driveshaft splines to form first and second splined connections, rotational energy transferred from the engine to the gearbox via the first and second splined connections;
    a plurality of accelerometers including first and second accelerometers coupled to the drivetrain configured to detect acceleration data, the first accelerometer coupled to the engine and the second accelerometer coupled to the gearbox such that the first and second accelerometers are at opposite ends of the driveshaft; and
    a flight control computer configured to measure misalignment at at least one of the splined connections using the acceleration data.

2. The driveshaft misalignment measurement system as recited in claim 1 wherein the driveshaft engine spline further comprises one of an internal spline or an external spline and the engine spline further comprises the other of the internal spline or the external spline.

3. The driveshaft misalignment measurement system as recited in claim 1 wherein the flight control computer further comprises a processor implementing a driveshaft misalignment measurement module to measure the misalignment at the at least one of the splined connections using the acceleration data; and
    wherein the processor further implements a displacement determination submodule to convert the acceleration data from the plurality of accelerometers into displacement data and a misalignment determination submodule to determine misalignment data at the at least one of the splined connections using the displacement data.

4. The driveshaft misalignment measurement system as recited in claim 1 wherein the flight control computer is configured to measure misalignment at the first and second splined connections using the acceleration data.

5. The driveshaft misalignment measurement system as recited in claim 1 wherein the plurality of accelerometers further comprise a plurality of engine accelerometers including the first accelerometer coupled to the engine and one or more gearbox accelerometers including the second accelerometer coupled to the gearbox.

6. The driveshaft misalignment measurement system as recited in claim 1 further comprising a driveshaft housing at least partially enclosing the driveshaft and the splined connections.

7. The driveshaft misalignment measurement system as recited in claim 6 wherein at least one of the plurality of accelerometers is coupled to the driveshaft housing.

8. The driveshaft misalignment measurement system as recited in claim 1 further comprising a display to generate a misalignment notification when the misalignment at the at least one of the splined connections exceeds a misalignment threshold a predetermined number of times.

9. A rotorcraft comprising:
a fuselage;
a propulsion system coupled to the fuselage;
a drivetrain coupled to the propulsion system; and
a driveshaft misalignment measurement system comprising:
a driveshaft having a first end forming a driveshaft engine spline and a second end forming a driveshaft gearbox spline;
a drivetrain subsystem including an engine and a gearbox each including a spline adapted to connect to a respective one of the driveshaft splines to form first and second splined connections, rotational energy transferred from the engine to the gearbox via the first and second splined connections;
a plurality of accelerometers including first and second accelerometers coupled to the drivetrain configured to detect acceleration data, the first accelerometer coupled to the engine and the second accelerometer coupled to the gearbox such that the first and second accelerometers are at opposite ends of the driveshaft; and
a flight control computer configured to measure misalignment at at least one of the splined connections using the acceleration data.

10. The rotorcraft as recited in claim 9 further comprising a wing coupled to the fuselage, the propulsion system coupled to the fuselage via the wing.

11. The rotorcraft as recited in claim 9 wherein the driveshaft engine spline further comprises one of an internal spline or an external spline and the engine spline further comprises the other of the internal spline or the external spline.

12. The rotorcraft as recited in claim 9 wherein the flight control computer further comprises a processor implementing a driveshaft misalignment measurement module to measure the misalignment at the at least one of the splined connections using the acceleration data; and
wherein the processor further implements a displacement determination submodule to convert the acceleration data from the plurality of accelerometers into displacement data and a misalignment determination submodule to determine misalignment data at the at least one of the splined connections using the displacement data.

13. The rotorcraft as recited in claim 9 wherein the flight control computer is configured to measure misalignment at the first and second splined connections using the acceleration data.

14. The rotorcraft as recited in claim 9 wherein the plurality of accelerometers further comprise a plurality of engine accelerometers including the first accelerometer coupled to the engine and one or more gearbox accelerometers including the second accelerometer coupled to the gearbox.

15. The rotorcraft as recited in claim 9 further comprising a driveshaft housing at least partially enclosing the driveshaft and the splined connections.

16. The rotorcraft as recited in claim 15 wherein at least one of the plurality of accelerometers is coupled to the driveshaft housing.

17. The rotorcraft as recited in claim 9 further comprising a display to generate a misalignment notification when the misalignment at the at least one of the splined connections exceeds a misalignment threshold a predetermined number of times.

* * * * *